US007339350B2

(12) United States Patent
Kubale et al.

(10) Patent No.: US 7,339,350 B2
(45) Date of Patent: *Mar. 4, 2008

(54) ELECTRICAL COMBINATION INCLUDING A BATTERY PACK

(75) Inventors: Mark Kubale, West Bend, WI (US); David Rozwadowski, Milwaukee, WI (US); Pamela Stegehuis, Helenville, WI (US); Robert Crisp, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/252,272

(22) Filed: Oct. 17, 2005

(65) Prior Publication Data
US 2006/0033467 A1    Feb. 16, 2006

Related U.S. Application Data

(63) Continuation of application No. 10/635,058, filed on Aug. 6, 2003, now Pat. No. 6,965,214, which is a continuation of application No. 10/299,200, filed on Nov. 19, 2002, now Pat. No. 6,621,246, which is a continuation of application No. 09/755,537, filed on Jan. 5, 2001, now Pat. No. 6,525,511.

(60) Provisional application No. 60/224,662, filed on Aug. 11, 2000.

(51) Int. Cl.
H01M 10/46 (2006.01)

(52) U.S. Cl. ..................................... 320/110

(58) Field of Classification Search ................ 320/107, 320/110, 112, 114, 115
See application file for complete search history.

(56) References Cited

U.S. PATENT DOCUMENTS

| | | | |
|---|---|---|---|
| 3,999,110 A | 12/1976 | Ramstrom et al. | |
| 4,006,396 A | 2/1977 | Bogut | |
| 4,123,598 A | 10/1978 | Hammel | |
| 4,186,983 A | 2/1980 | Kaye | |
| 4,309,067 A | 1/1982 | Riley, Jr. | |
| 4,315,364 A | 2/1982 | Leffingwell | |
| D265,985 S | 8/1982 | House, II | |
| 4,447,749 A | 5/1984 | Reeb, Jr. et al. | |
| D278,704 S | 5/1985 | Claxton et al. | |
| 4,530,034 A | 7/1985 | Kawarada | |
| 4,576,880 A | 3/1986 | Verdier et al. | |
| 4,716,352 A | 12/1987 | Hurn et al. | |
| 4,737,420 A | 4/1988 | Ikeda et al. | |
| 4,746,298 A | 5/1988 | Hollander | |
| 4,835,410 A | 5/1989 | Bhagwat et al. | |
| 4,871,629 A | 10/1989 | Bunyea | |
| 4,943,498 A | 7/1990 | Cooper et al. | |
| 4,957,831 A | 9/1990 | Meredith et al. | |
| 4,969,206 A | 11/1990 | Desrochers | |
| 5,030,902 A | 7/1991 | Mattinger et al. | |
| 5,057,383 A | 10/1991 | Sokira | |
| 5,076,805 A | 12/1991 | Welsh | |
| 5,095,259 A | 3/1992 | Bailey et al. | |
| 5,132,800 A | 7/1992 | Wada et al. | |
| 5,136,229 A | 8/1992 | Galvin | |
| 5,138,245 A | 8/1992 | Mattinger et al. | |
| 5,144,217 A | 9/1992 | Gardner et al. | |
| 5,148,094 A | 9/1992 | Parks et al. | |
| 5,151,727 A | 9/1992 | Sasaki | |
| 5,159,256 A | 10/1992 | Mattinger et al. | |
| 5,169,225 A | 12/1992 | Palm | |
| 5,187,422 A | 2/1993 | Izenbaard et al. | |
| 5,192,904 A | 3/1993 | Leiserson | |

(Continued)

FOREIGN PATENT DOCUMENTS

AU        762976        7/2003

(Continued)

OTHER PUBLICATIONS

IBM, Automatic Charge Rate Adjustment for Multiple Batteries, Technical Disclosure Bulletin, Mar. 1994, vol. 37 No. 03, IBM.

(Continued)

Primary Examiner—Edward H Tso
(74) Attorney, Agent, or Firm—Michael Best & Friedrich LLP

(57) ABSTRACT

An electrical combination, a method and a power tool. An electrical combination may includes an electrical component including a component housing, and an electrical circuit supported by the component housing, a first terminal assembly at least electrically connectable to the electrical circuit, a second terminal assembly at least electrically connectable to the electrical circuit, a first battery including a first battery terminal assembly electrically connectable to the first terminal assembly to electrically connect the first battery to the electrical circuit such that power is transferable between the first battery and the electrical circuit, and a second battery including a second battery terminal assembly electrically connectable to the second terminal assembly to electrically connect the second battery to the electrical circuit such that power is transferable between the second battery and the electrical circuit. The second battery may be different than the first battery. At least one of the first battery terminal assembly is not electrically connectable to the second terminal assembly and the second battery terminal assembly is not electrically connectable to the first terminal assembly.

20 Claims, 13 Drawing Sheets

U.S. PATENT DOCUMENTS

| | | |
|---|---|---|
| 5,200,686 A | 4/1993 | Lee |
| 5,200,690 A | 4/1993 | Uchida |
| 5,213,913 A | 5/1993 | Anthony, III et al. |
| 5,217,395 A | 6/1993 | Bailey et al. |
| 5,227,262 A | 7/1993 | Ozer |
| 5,229,701 A | 7/1993 | Léman et al. |
| 5,231,913 A | 8/1993 | Reinartz et al. |
| 5,240,787 A | 8/1993 | Goldschmidt et al. |
| 5,248,927 A | 9/1993 | Takei et al. |
| 5,341,171 A | 8/1994 | Mori et al. |
| 5,354,215 A | 10/1994 | Viracola |
| 5,368,954 A | 11/1994 | Bruns |
| 5,391,972 A | 2/1995 | Gardner et al. |
| 5,470,255 A | 11/1995 | McCleerey et al. |
| 5,476,729 A | 12/1995 | Miller, Jr. et al. |
| 5,518,424 A | 5/1996 | Douty et al. |
| 5,552,240 A | 9/1996 | Derstine |
| 5,553,675 A | 9/1996 | Pitzen et al. |
| 5,602,454 A | 2/1997 | Arakawa et al. |
| 5,620,808 A | 4/1997 | Wheeler et al. |
| 5,634,815 A | 6/1997 | Inazuka et al. |
| 5,659,236 A | 8/1997 | Hahn |
| 5,686,808 A | 11/1997 | Lutz |
| 5,718,985 A | 2/1998 | Bunyea et al. |
| 5,734,253 A | 3/1998 | Brake et al. |
| 5,757,163 A | 5/1998 | Brotto et al. |
| 5,769,657 A | 6/1998 | Kondo et al. |
| 5,782,654 A | 7/1998 | Inazuka et al. |
| D396,687 S | 8/1998 | Somers |
| D397,084 S | 8/1998 | Siddoway |
| 5,792,573 A | 8/1998 | Pitzen et al. |
| 5,818,197 A | 10/1998 | Miller et al. |
| 5,856,038 A | 1/1999 | Mason |
| 5,926,005 A | 7/1999 | Holcomb et al. |
| 5,929,597 A | 7/1999 | Pfeifer et al. |
| 5,933,496 A * | 8/1999 | McKinnon ............ 379/433.08 |
| D415,100 S | 10/1999 | Buck |
| 5,963,011 A * | 10/1999 | Haller et al. ................ 320/106 |
| 6,007,373 A | 12/1999 | Chew |
| 6,057,608 A | 5/2000 | Bailey, Jr. et al. |
| 6,075,341 A | 6/2000 | White et al. |
| 6,104,162 A * | 8/2000 | Sainsbury et al. .......... 320/111 |
| D432,077 S | 10/2000 | Zurwelle et al. |
| 6,151,451 A | 11/2000 | Yukitake et al. |
| 6,168,881 B1 | 1/2001 | Fischer et al. |
| 6,181,032 B1 | 1/2001 | Marshall et al. |
| 6,237,698 B1 | 5/2001 | Carrier et al. |
| 6,285,159 B1 | 9/2001 | Ki et al. |
| 6,296,065 B1 | 10/2001 | Carrier et al. |
| 6,304,058 B2 | 10/2001 | Watson et al. |
| 6,308,059 B1 | 10/2001 | Domes |
| 6,326,101 B1 | 12/2001 | White et al. |
| 6,329,788 B1 | 12/2001 | Bailey, Jr. et al. |
| 6,350,149 B1 | 2/2002 | Nakane |
| 6,371,535 B2 | 4/2002 | Wei et al. |
| D460,413 S | 7/2002 | Zurwelle et al. |
| D466,863 S | 12/2002 | Zurwelle et al. |
| 6,495,932 B1 | 12/2002 | Yoshimizu et al. |
| 6,500,581 B2 | 12/2002 | White et al. |
| 6,501,197 B1 | 12/2002 | Cornog et al. |
| 6,502,949 B1 | 1/2003 | Horiyama et al. |
| 6,515,451 B2 | 2/2003 | Watson et al. |
| 6,525,511 B2 | 2/2003 | Kubale et al. |
| 6,534,885 B2 | 3/2003 | Nakagawa et al. |
| 6,562,509 B1 | 5/2003 | Eggert |
| 6,566,843 B2 | 5/2003 | Takano et al. |
| D475,679 S | 6/2003 | Cooper et al. |
| D477,811 S | 7/2003 | Niwa et al. |
| 6,597,572 B2 | 7/2003 | Nishikawa et al. |
| 6,617,824 B1 * | 9/2003 | Zedell et al. ................ 320/110 |
| 6,621,246 B2 | 9/2003 | Kubale et al. |
| D481,672 S | 11/2003 | Niwa et al. |
| 6,641,950 B2 | 11/2003 | White et al. |
| 6,653,815 B2 | 11/2003 | Watson et al. |
| D484,384 S | 12/2003 | Ghode et al. |
| D484,850 S | 1/2004 | Johnson |
| D487,426 S | 3/2004 | Johnson |
| D488,774 S | 4/2004 | Zufall et al. |
| D490,052 S | 5/2004 | Zufall et al. |
| 6,729,413 B2 | 5/2004 | Turner et al. |
| 6,781,249 B2 | 8/2004 | Holder et al. |
| 6,840,335 B1 | 1/2005 | Wu |
| D504,111 S | 4/2005 | Ozawa et al. |
| D504,394 S | 4/2005 | Cheung et al. |
| 6,876,173 B2 | 4/2005 | Mastaler et al. |
| 6,891,457 B2 | 5/2005 | Sako |
| 6,933,689 B2 | 8/2005 | Yamamoto |
| D509,189 S | 9/2005 | Buck |
| 6,943,527 B2 | 9/2005 | Liu et al. |
| 6,965,213 B2 | 11/2005 | Schadoffsky et al. |
| 6,965,214 B2 * | 11/2005 | Kubale et al. ............... 320/114 |
| 7,005,831 B2 | 2/2006 | Watson et al. |
| 2001/0017531 A1 | 8/2001 | Sakakibara et al. |
| 2003/0011245 A1 | 1/2003 | Fiebig |
| 2004/0051502 A1 | 3/2004 | White et al. |
| 2004/0072064 A1 | 4/2004 | Turner et al. |
| 2004/0106036 A1 | 6/2004 | Geis et al. |
| 2004/0192106 A1 | 9/2004 | Britz |
| 2004/0197175 A1 | 10/2004 | Turner et al. |
| 2006/0151189 A1 | 7/2006 | Wu |

FOREIGN PATENT DOCUMENTS

| | | |
|---|---|---|
| CA | 2 169 261 | 2/1995 |
| DE | 26 18 748 | 11/1977 |
| DE | 3742268 A1 | 6/1989 |
| DE | 3902442 | 8/1989 |
| DE | 3825120 | 11/1989 |
| DE | 4031090 | 4/1992 |
| DE | 42 16 045 | 11/1993 |
| DE | 94 04 008 | 7/1994 |
| DE | 44 02 355 | 8/1995 |
| DE | 29509191 U1 | 8/1995 |
| DE | 19933015 | 5/2000 |
| DE | 10055158 A1 | 7/2001 |
| DE | 10056370 A1 | 7/2001 |
| DE | 10040893 A1 | 8/2001 |
| DE | 10107358 | 9/2001 |
| DE | 10125157 A1 | 11/2001 |
| DE | 10124537 A1 | 2/2002 |
| DE | 10215348 | 10/2002 |
| DE | 20305628 U1 | 6/2003 |
| DE | 10233162 A2 | 2/2004 |
| DE | 10313187 A1 | 10/2004 |
| DE | 20023629 U1 | 5/2005 |
| EP | 0 255 568 | 2/1988 |
| EP | 0 341 395 | 11/1989 |
| EP | 0 545 132 | 6/1993 |
| EP | 0548651 B1 | 6/1993 |
| EP | 0 551 302 | 7/1993 |
| EP | 0 561 423 | 9/1993 |
| EP | 0 572 327 | 12/1993 |
| EP | 0 707 350 | 4/1996 |
| EP | 0 714 235 | 6/1996 |
| EP | 0 720 780 | 7/1996 |
| EP | 0 786 821 | 7/1997 |
| EP | 0734083 B1 | 12/1999 |
| EP | 1069630 B1 | 1/2001 |
| EP | 1289032 A1 | 3/2003 |
| EP | 1025962 B1 | 9/2003 |
| EP | 1382421 A2 | 1/2004 |
| EP | 1025961 B1 | 6/2004 |
| EP | 1035599 B1 | 10/2004 |
| EP | 1076370 B1 | 12/2004 |

| | | | | | | |
|---|---|---|---|---|---|---|
| EP | 1481769 | A1 | 12/2004 | JP | 2859341 | 9/1991 |
| EP | 1516702 | A2 | 3/2005 | JP | 3503986 | 9/1991 |
| EP | 1555703 | A2 | 7/2005 | JP | 4-253171 | 9/1992 |
| EP | 1363339 | B1 | 10/2005 | WO | WO 89/07997 | 9/1989 |
| EP | 1584435 | A2 | 10/2005 | WO | WO 92/05919 | 4/1992 |
| EP | 0979711 | B1 | 1/2006 | WO | WO 95/00992 | 1/1995 |
| FI | 901889 | | 10/1991 | WO | WO 95/05071 | 2/1995 |
| GB | 2 215 386 | | 9/1989 | WO | WO 95/05683 | 2/1995 |
| GB | 2302050 | A | 1/1997 | WO | WO 95/24061 A1 | 9/1995 |
| GB | 2302051 | A | 1/1997 | WO | WO 98/48470 A1 | 10/1998 |
| GB | 2392002 | B | 2/2004 | WO | WO 01/05559 A2 | 1/2001 |
| GB | 2386746 | B | 5/2004 | WO | WO 2005/009043 A2 | 10/2005 |
| GB | 2399701 | A1 | 9/2004 | WO | WO 2006/027284 A1 | 3/2006 |
| GB | 2380761 | B | 2/2005 | WO | WO 2006/040204 A1 | 4/2006 |
| GB | 2408396 | A | 5/2005 | | | |
| GB | 2417978 | A | 3/2006 | | | |
| GB | 2418057 | A | 3/2006 | | | |
| GB | 2419242 | A | 4/2006 | | | |
| GB | 2419243 | A | 4/2006 | | | |
| GB | 2419244 | A | 4/2006 | | | |
| GB | 2419245 | A | 4/2006 | | | |
| GB | 2420029 | A | 5/2006 | | | |
| GB | 2420030 | A | 5/2006 | | | |
| GB | 2420031 | A | 5/2006 | | | |
| GB | 2420032 | A | 5/2006 | | | |
| JP | 1-227349 | | 9/1989 | | | |
| JP | 2-19187 | | 1/1990 | | | |
| JP | 3052555 | | 3/1991 | | | |

OTHER PUBLICATIONS

Makita, Makita's 24V Maximum Cordless with MakStar System, Press Release, Jul. 28, 2000, La Mirada, CA-Makita USA, Inc.

Snap-on Quality Tools and Service Equipment, Catalog 800, Power Tools, Cordless Batteries and Chargers, CT and CDR Series Tools, p. 256.

Snap-on Tools, Power Tools Index, Power Tools, Cordless Batteries and Chargers, Snap-on Battery Chargers (CT and CDR Series Tools), http://buy.1snapon.com/catalog/tools.asp?tool=power&GroupID=19406&store=snapon-store, webpage accessed Jan. 26, 2007.

* cited by examiner

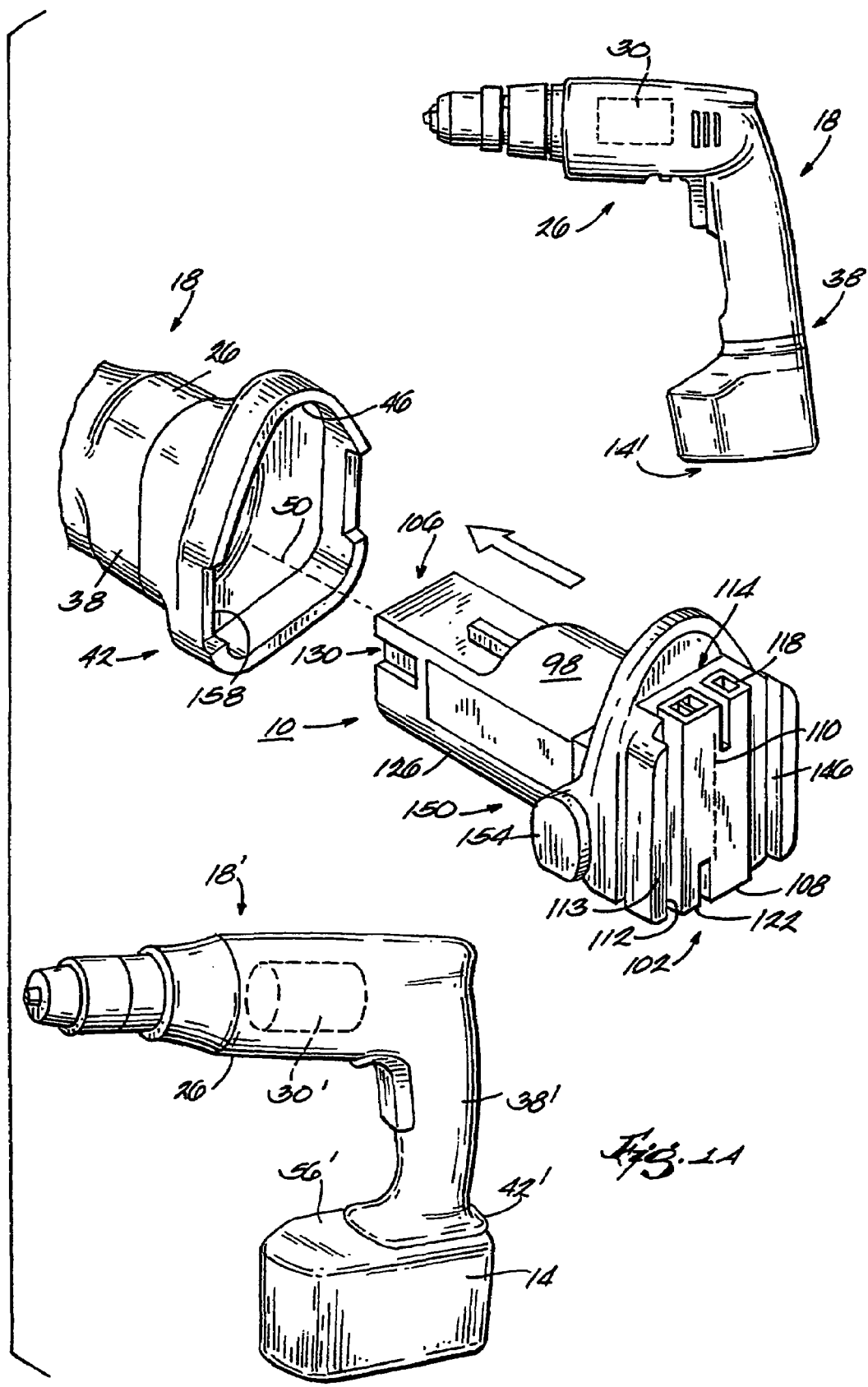

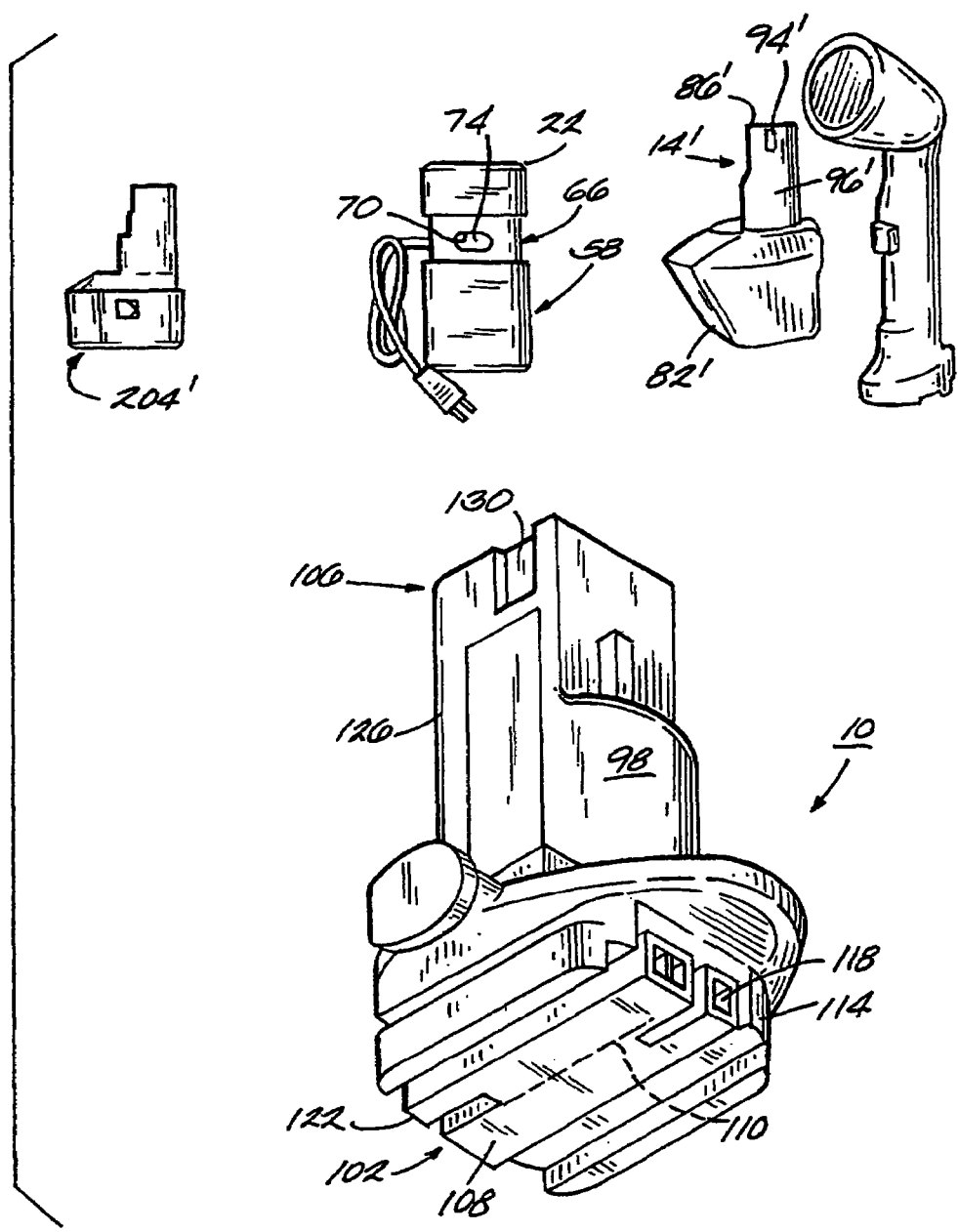

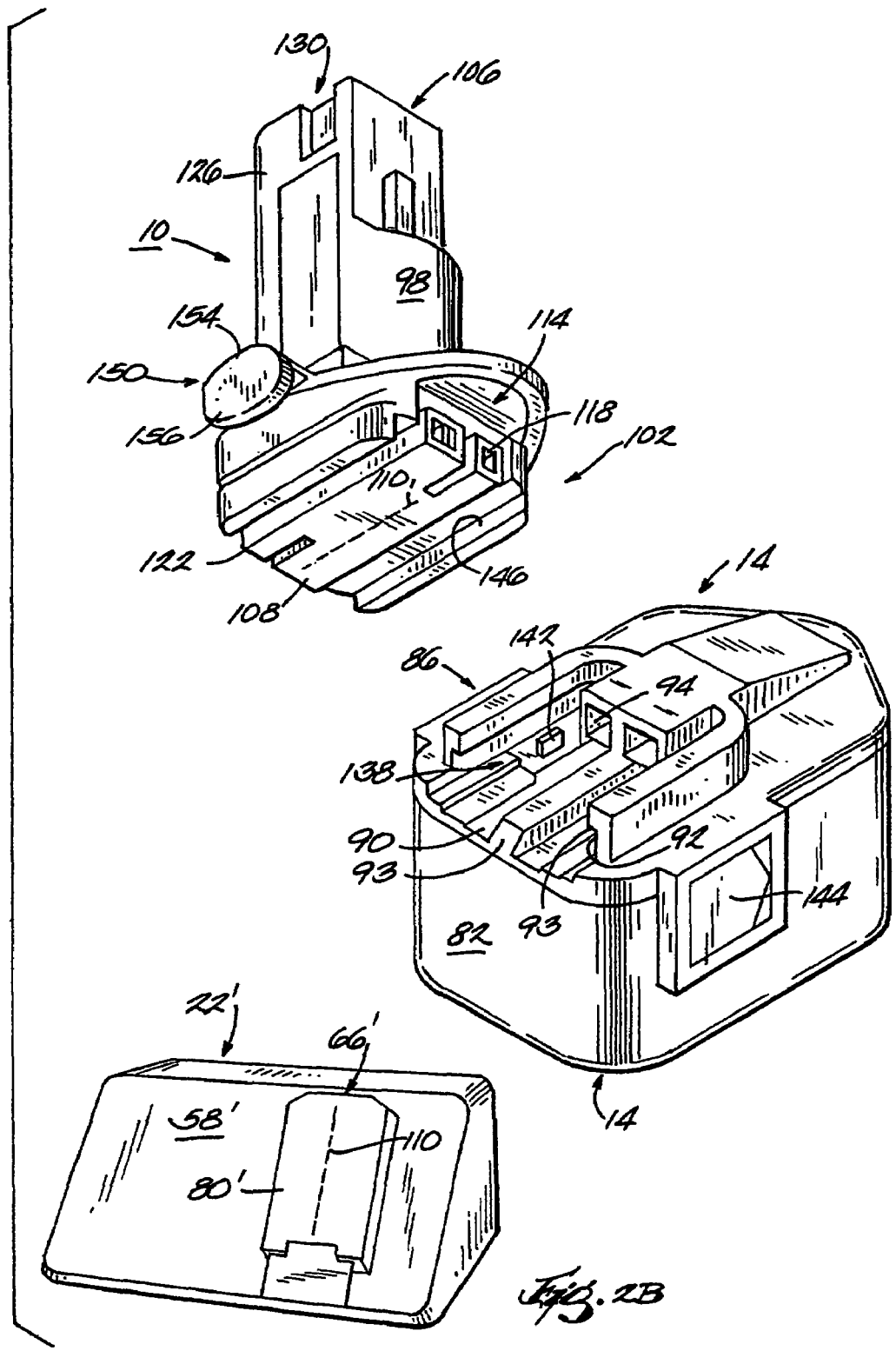

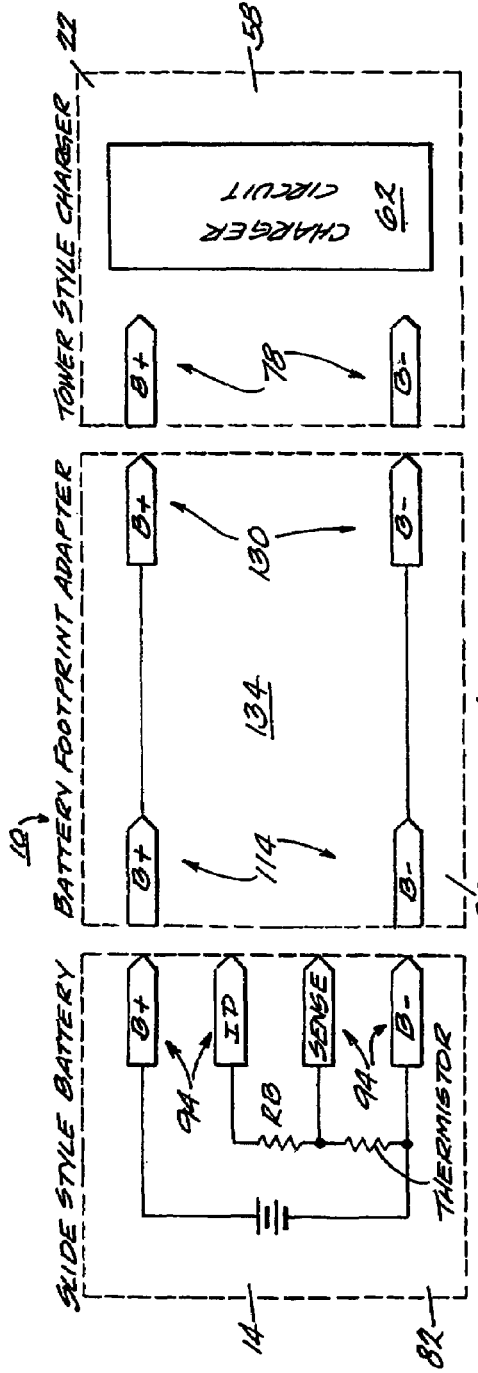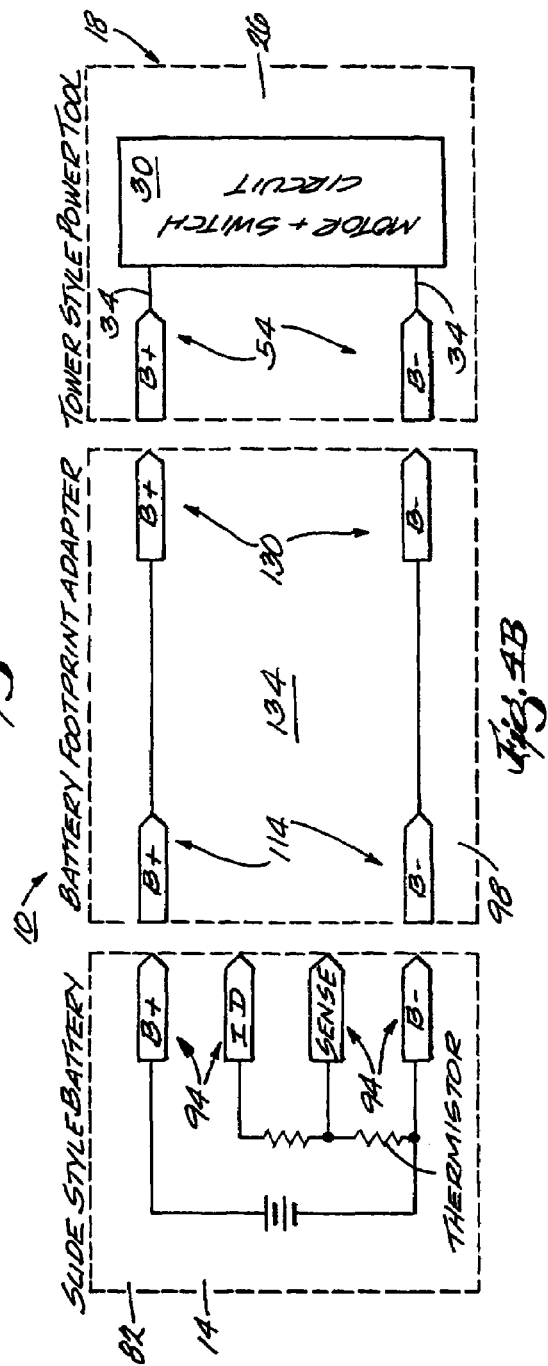

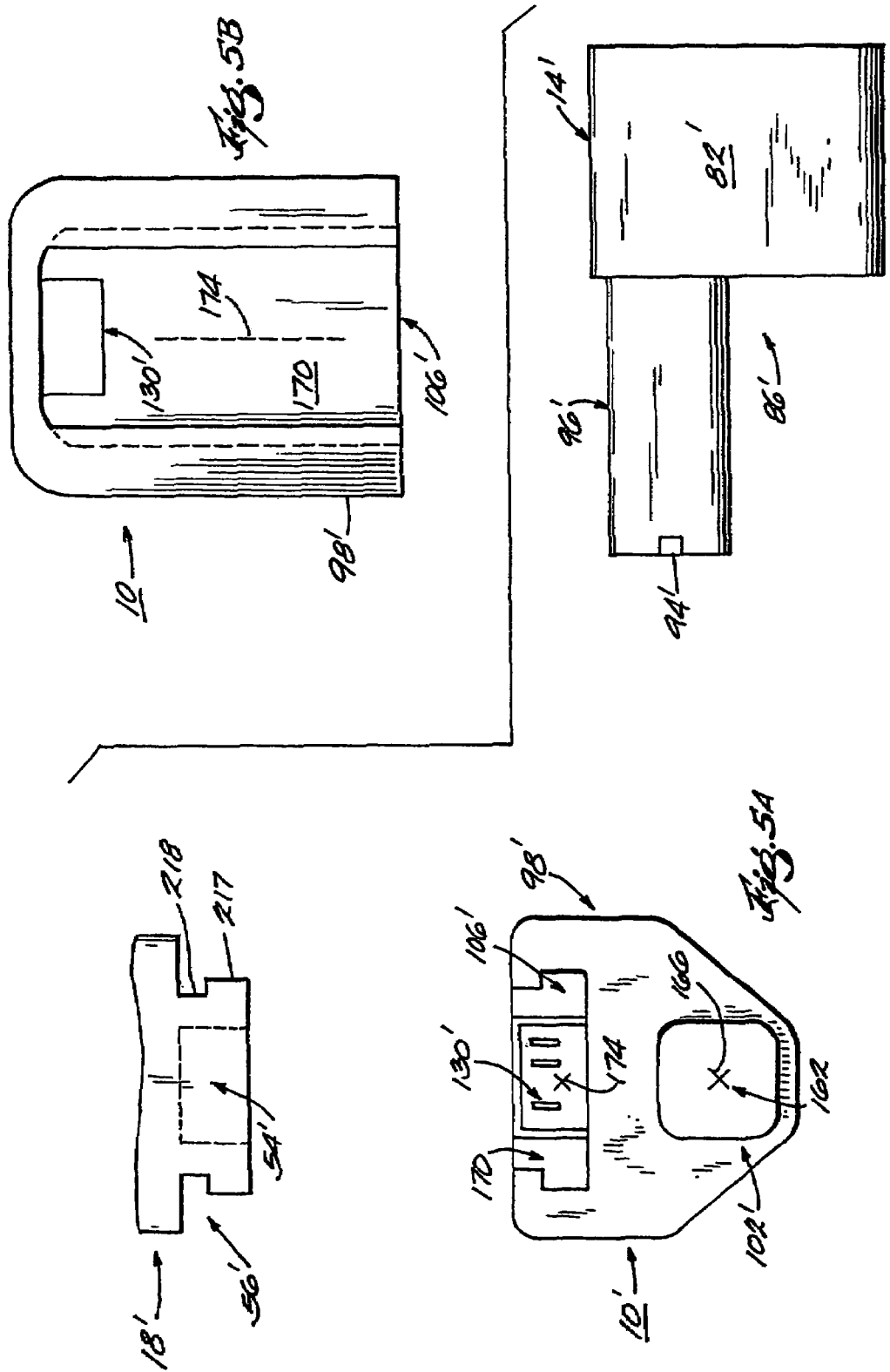

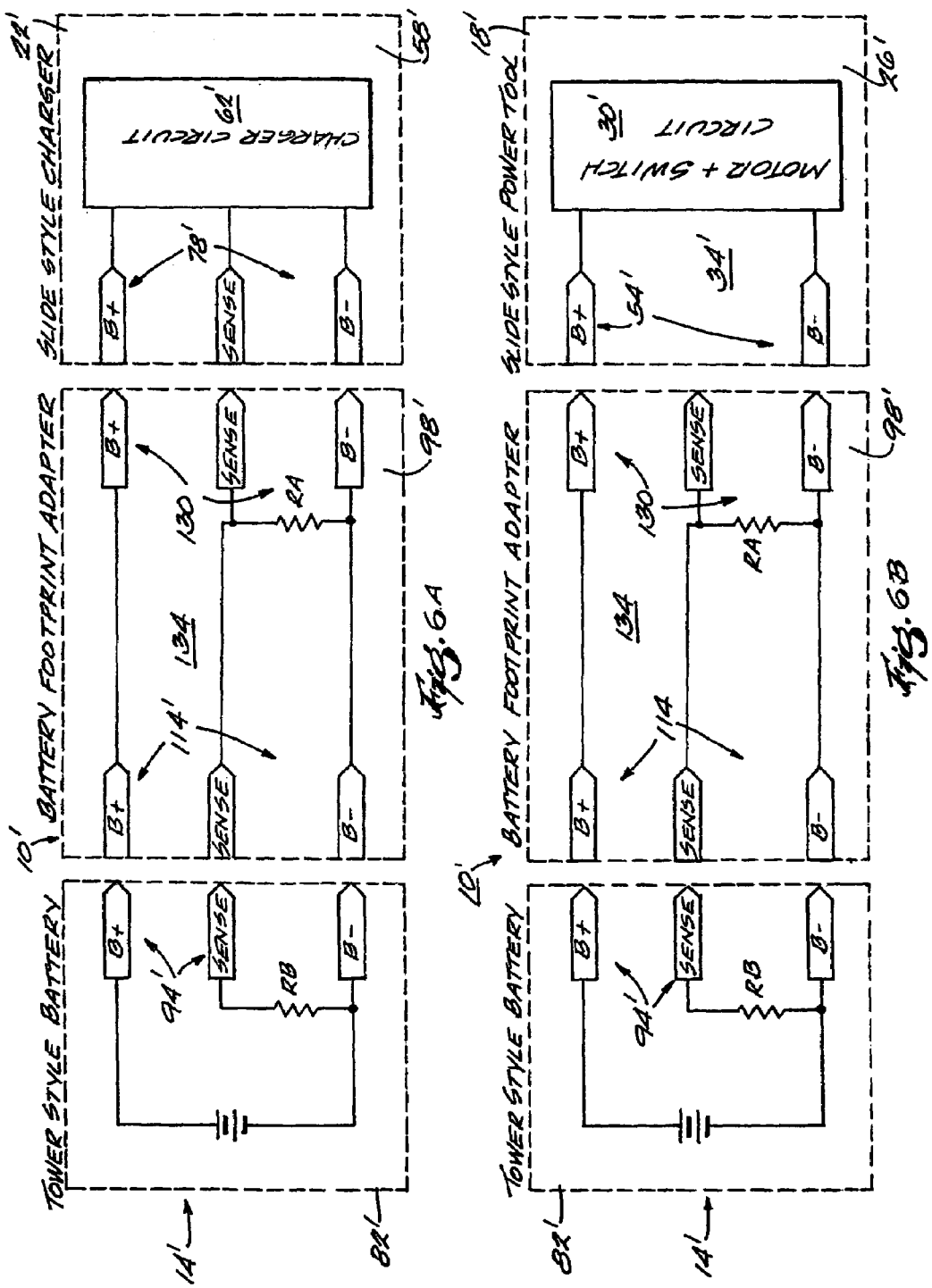

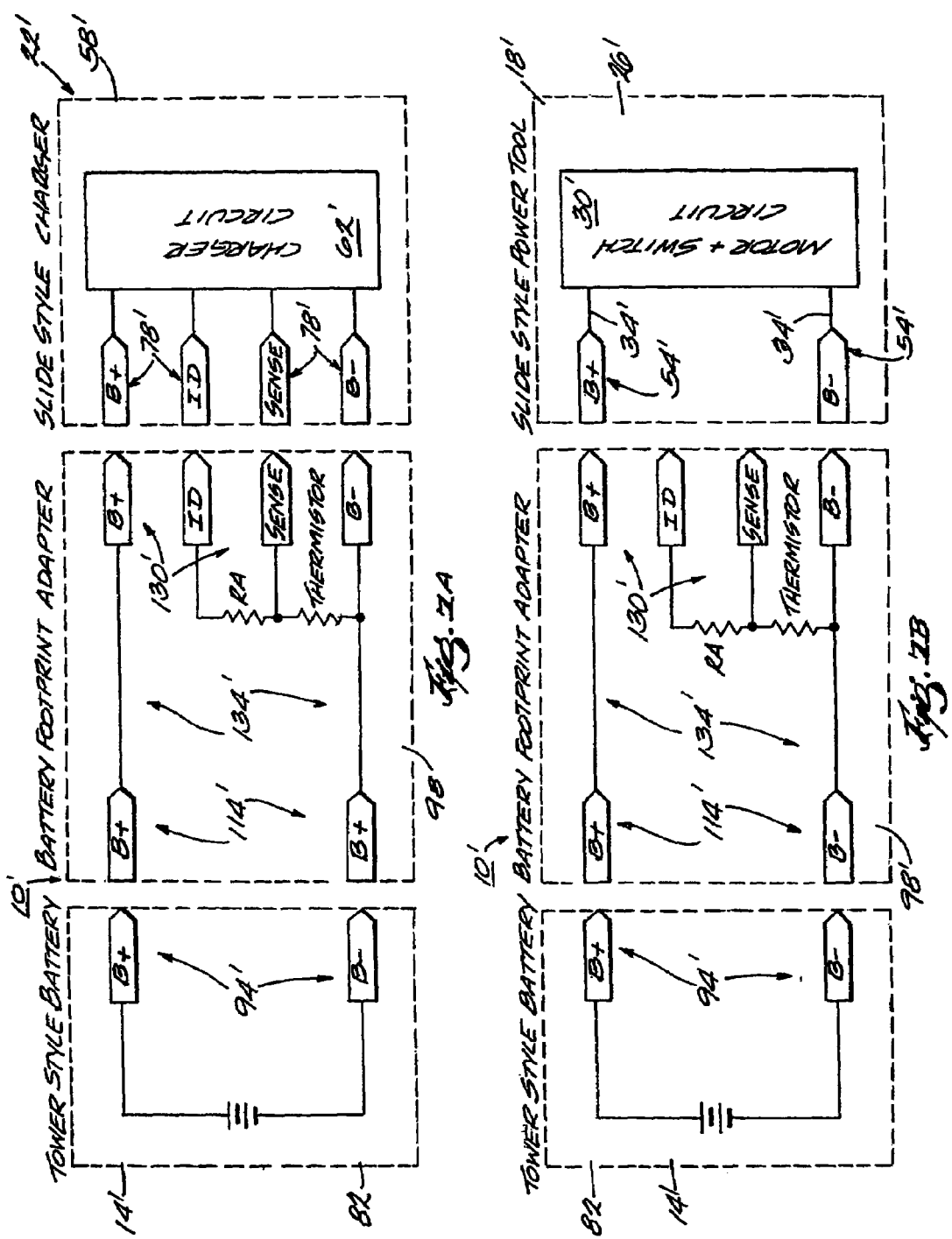

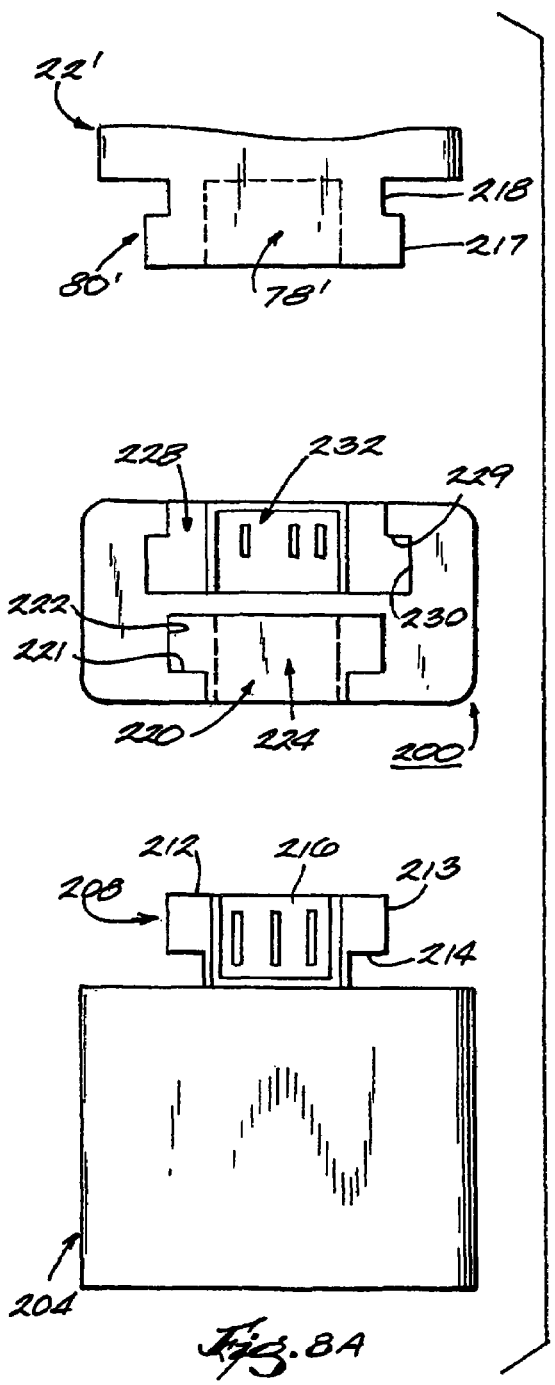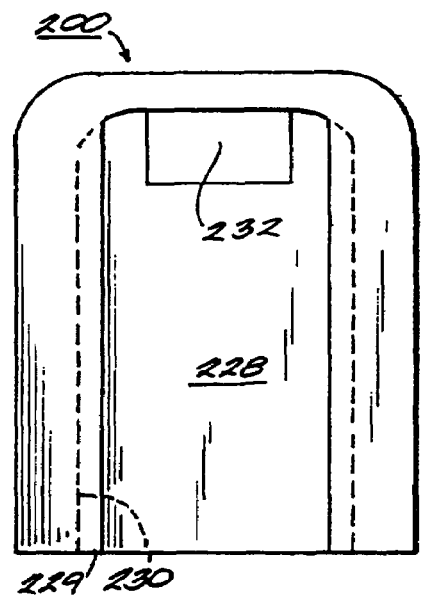
Fig. 8A
Fig. 8B

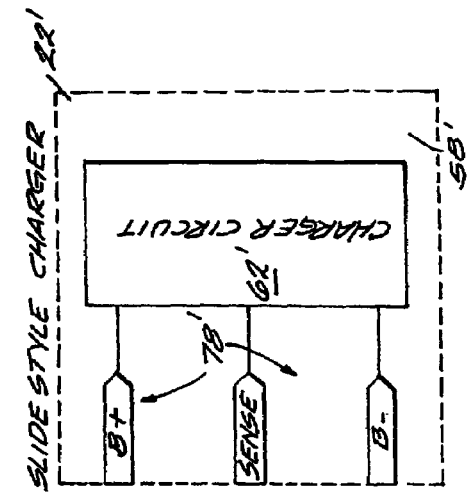
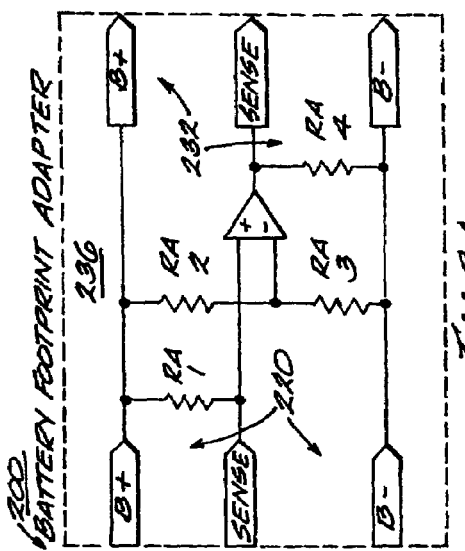
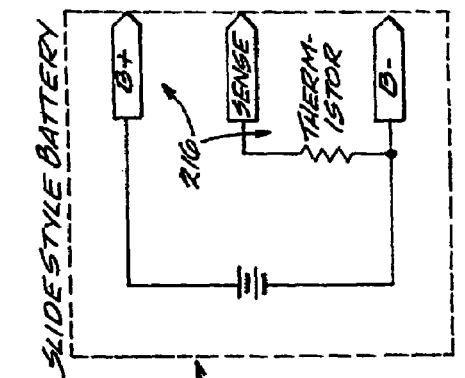
Fig. 9A
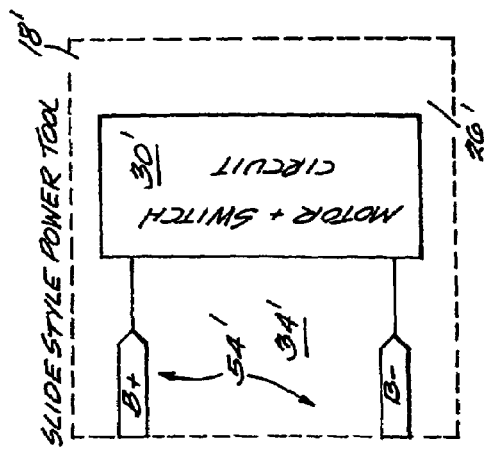
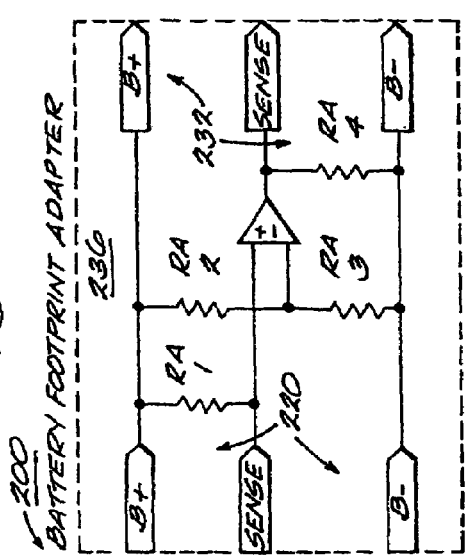
Fig. 9B

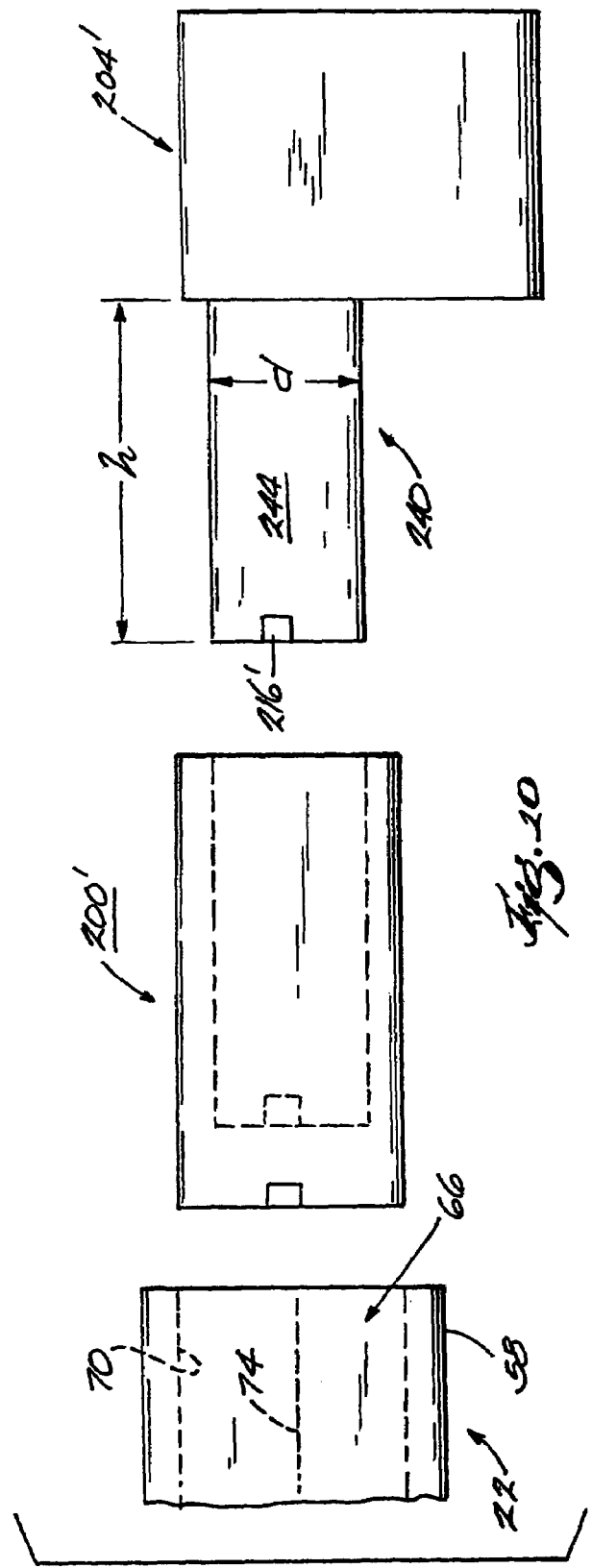

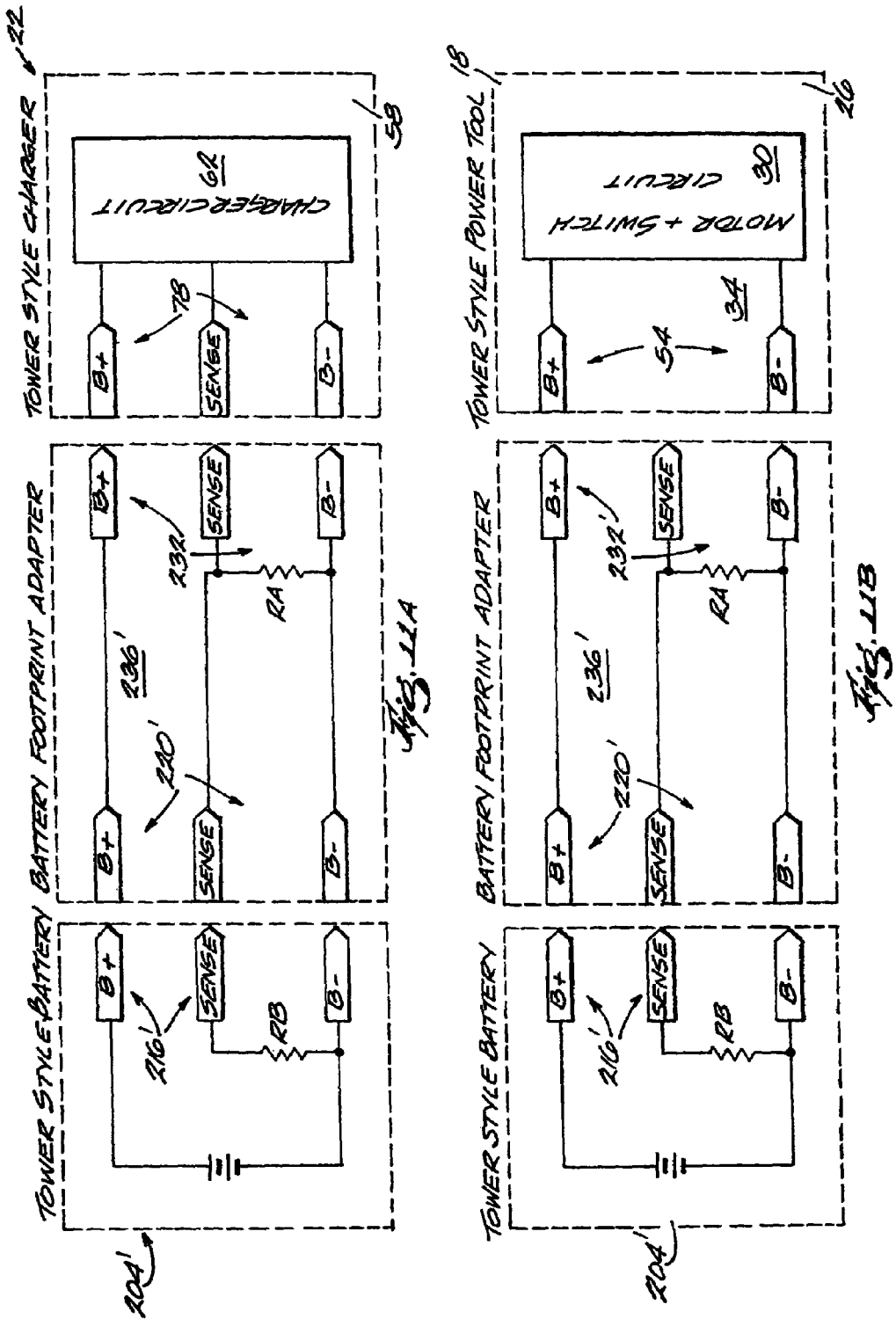

ELECTRICAL COMBINATION INCLUDING A BATTERY PACK

RELATED APPLICATIONS

The present application is a continuation of continuation patent application Ser. No. 10/635,058, filed on Aug. 6, 2003 now U.S. Pat. No. 6,965,214, claims the benefit and is a continuation of patent application Ser. No. 10/299,200, filed on Nov. 19, 2002, now U.S. Pat. No. 6,621,246, which claims the benefit and is a continuation of patent application Ser. No. 09/755,537, filed on Jan. 5, 2001, now U.S. Pat. No. 6,525,511, which claims the benefit of prior filed provisional patent application Ser. No. 60/224,662, filed on Aug. 11, 2000, the entire contents of all of which are hereby incorporated by reference.

FIELD OF THE INVENTION

The present invention relates to cordless power tools and, more particularly, to battery packs, power tools and/or battery chargers.

BACKGROUND OF THE INVENTION

Generally, a cordless power tool includes a tool housing and an electric motor supported by the housing and operable to drive a tool element. A power tool battery is supported by the housing and is electrically connectable to the motor to selectively supply power to the motor.

To charge the battery, a battery charger is provided. Typically, a battery charger includes a charger housing and a charging circuit supported by the charger housing and electrically connectable to a power source. The battery is supported by the charger housing and electrically connected to the charging circuit so that power is selectively supplied to the battery to charge the battery.

SUMMARY OF THE INVENTION

There are two types of general configurations for a power tool battery (and for the power tool and the battery charger). The first type is the "tower" battery configuration. In the "tower" configuration, a portion of the tool housing, such as the handle, defines an opening, and the battery includes a "tower" or insertion portion which is inserted into the opening to support the battery on the tool housing and to electrically connect the battery to the motor. To charge the "tower" battery, the charger housing defines a similar opening, and the "tower" portion of the battery is inserted into the opening in the charger housing to support the battery on the charger housing and to electrically connect the battery to the charging circuit.

The second type of battery configuration is the "slide-on" configuration. In the "slide-on" configuration, the tool housing includes a support portion, and the battery slides onto the support portion. The support portion and the battery include inter-engaging connecting structure to physically connect the battery to the tool housing and to electrically connect the battery to the motor. To charge the "slide-on" battery, the charger housing includes a similar support portion, and the battery and the charger housing include similar inter-engaging connecting structure to physically connect the battery to the charger housing and to electrically connect the battery to the charging circuit.

In each general configuration, many different battery constructions (and power tool/battery charger constructions) exist. In each construction, the battery (and the power tool/battery charger) includes a specific connecting structure (size, shape, connectors, position of connectors, etc.) for physically connecting the battery to the power tool and/or to the charger and for electrically connecting the battery to the motor and/or to the charging circuit.

One independent problem with the above-described battery arrangements is that a battery having one configuration, such as the "slide-on" configuration, is not useable with a power tool having another configuration, such as the "tower" configuration, or vice versa.

Another independent problem with the above-described battery arrangements is that a battery having one configuration, such as the "slide-on" configuration, cannot be charged by a charger having the other configuration, such as the "tower" configuration, or vice versa.

Yet another independent problem with the above-described battery arrangements is that a battery having one general configuration, such as a "slide-on" configuration with a first connecting structure, may not be useable with a power tool of the same general configuration but having a different connecting structure, such as a power tool including a "slide-on" configuration but with a different second connecting structure. The differences in the connecting structures, to physically and/or electrically connect the battery to the power tool, prevent the battery from being used with the power tool. The same applies for "tower" batteries and "tower" power tools having different connecting structures.

A further independent problem with the above-described battery arrangements is that the battery having a one general configuration, such as a "slide-on" battery with a first connecting structure, may not be chargeable by a battery charger having the same general configuration but having a different connecting structure, such as a "slide-on" battery charger having a second connecting structure configuration. The differences in the connecting structure, to physically and/or electrically connect the battery to the battery charger, prevent the battery from being charged by the battery charger. The same applies for "tower" batteries and "tower" battery chargers having different connecting structures.

The present invention provides an adapter for a power tool battery which substantially alleviates one of more of the above-described and other problems with the above-described battery arrangements. More particularly, in some constructions, the invention provides an adapter which is used to connect a battery having a first general configuration, such as a "slide-on" configuration or a "tower" configuration, to a power tool and/or to a battery charger having a second general configuration, such as the "tower" configuration or the "slide-on" configuration, respectively. In other constructions, the invention provides an adapter which is used to connect a battery having a first general configuration, such as the "slide-on" configuration or the "tower" configuration, and a first connecting structure to a power tool and/or to a battery charger having the same first general configuration and a second connecting structure different than the first connecting structure.

More particularly, the invention provides an electrical combination comprising an electrical component including a component housing, a battery electrically connectable to the electrical component to transfer power between the electrical component and the battery, and an adapter separate from and connectable between the battery and the component housing to support the battery on the component housing and, preferably, to electrically connect the battery to the electrical component.

Also, the invention provides an electrical combination comprising a power tool including a housing and an electric motor supported by the housing and operable to drive a tool element, a battery electrically connectable to the motor to selectively power the motor, and an adapter separate from and connectable between the battery and the housing to support the battery on the housing and, preferably, to electrically connect the battery to the motor.

In addition, the invention provides an electrical combination comprising a battery charger including a charger housing and a charging circuit supported by the charger housing and selectively connectable with a power source, a battery electrically connectable with a charging circuit such that the charging circuit selectively supplies power to the battery to charge the battery, and an adapter separate from and connectable between the housing and the battery to support the battery on the housing and, preferably, to electrically connect the battery to the charging circuit.

Preferably, the battery includes a terminal assembly and the electrical component includes a component terminal assembly. The adapter preferably includes a first adapter terminal assembly electrically connectable to the battery terminal assembly and a second adapter terminal assembly electrically connectable to the component terminal assembly to electrically connect the battery to the electrical component.

In one construction, the component housing defines an opening and the adapter includes an insertion portion which is insertable into the opening to support the adapter on the component housing. The electrical component preferably includes a component terminal assembly supported in the opening, and the adapter includes an adapter terminal assembly supported on the insertion portion. The adapter terminal assembly is electrically connected to the component terminal assembly when the insertion portion is inserted into the opening.

The adapter preferably includes a battery support portion connected to the insertion portion, and the battery is connectable to and supportable by the support portion. Preferably, the battery is connectable to the support portion along a battery attachment axis generally perpendicular to the opening axis.

The battery may be selectively connectable to the support portion along the battery attachment axis in a first direction, in which the battery is supported in a first orientation relative to the housing, and in a second direction, in which the battery is supported in a second orientation relative to the housing. The battery is preferably selectively connectable to the support portion in the first direction, in which the battery is supported in a first orientation relative to the adapter, and in the second direction, in which the battery is supported in a second orientation relative to the adapter.

The adapter preferably includes a forward first terminal assembly and a rearward first terminal assembly. In the first orientation, the battery terminal assembly is electrically connected to the forward first terminal assembly, and, in the second orientation, the battery terminal assembly is electrically connected to the rearward first terminal assembly.

Preferably, the battery has a first connection configuration, and the housing has a second connection configuration different than the first connection configuration. The adapter preferably includes a first connecting portion having the first connection configuration and a second connecting portion having the second connection configuration. The first connecting portion is connectable with a battery to connect the battery to the adapter, and the second connecting portion is connectable with the housing to connect the adapter to the housing.

The connection configurations of the battery and the electrical component may be different general configurations ("slide-on" or "tower") or may be the same general configuration but with different physical connecting structure and/or with different electrical connecting structure. In one construction, one connection configuration is a "tower" configuration, and the other configuration is a "slide-on" configuration. In other constructions, the first connection configuration is a first "tower" configuration or a first "slide-on" configuration, and the second configuration is a second "tower" configuration or a second "slide-on" configuration, respectively, having different physical connecting structure and/or different electrical connecting structure.

The combination preferably further comprises a first locking assembly for locking the battery to the adapter and a second locking assembly for locking the adapter to the component housing.

Further, the invention provides an electrical combination comprising a power tool including a tool housing and an electric motor supported by the tool housing and operable to drive a tool element, a battery charger including a charger housing and a charging circuit supported by the charger housing and selectively electrically connectable with a power source, a battery, and an adapter separate from and connectable between the battery and one of the power tool and the battery charger to support the battery on the one of the power tool and the battery charger and to transfer power between the battery and the one of the power tool and the battery charger.

In one construction, the adapter is alternatively connectable between the battery and the power tool to support the battery on the power tool and between the battery and the battery charger to support the battery on the battery charger. In another construction, the battery is connectable without the adapter to the other of the power tool and the battery charger.

One independent advantage of the present invention is that, with some constructions of the present adapter, a battery having one configuration, such as a "slide-on" configuration, may be used with a power tool having another configuration, such as a "tower" configuration.

Another independent advantage of the present invention is that, with some constructions of the present adapter, a battery having one configuration, such as a "slide-on" configuration, may be charged by a battery charger having another configuration, such as a "tower" configuration.

Yet another independent advantage of the present invention is that, with some constructions of the present adapter, a battery having one general configuration, such as a "slide-on" configuration or a "tower" configuration, and a first connecting structure may be used with a power tool having the same general configuration, such as the "slide-on" configuration or the "tower" configuration, respectively, and a second connecting structure different than the first connecting structure.

A further independent advantage of the present invention is that, with some constructions of the present adapter, a battery having one general configuration, such as a "slide-on" configuration or a "tower" configuration, and a first connecting structure may be charged by a battery charger having the same general configuration, such as the "slide-on" configuration or the "tower" configuration, respectively, and a second connecting structure different than the first connecting structure.

Other independent features and independent advantages of the present invention will become apparent to those skilled in the art upon review of the following detailed description, claims and drawings.

BRIEF DESCRIPTION OF THE DRAWINGS

FIGS. 1A and 1B are perspective views of an electrical combination including the adapter embodying the invention and illustrating the connection of the adapter between an electrical component, such as a power tool, and a battery.

FIGS. 2A and 2B are perspective views of another electrical combination including the adapter and illustrating connection of the adapter between another electrical component, such as a battery charger, and the battery.

FIGS. 4A and 4B are schematic diagrams similar to FIGS. 3A and 3B.

FIGS. 5A and 5B are views of an alternate construction of an adapter embodying the invention.

FIGS. 6A and 6B are schematic diagrams illustrating the connection of a battery having a "tower" configuration to an electrical component having a "slide-on" configuration.

FIGS. 7A and 7B are schematic diagrams similar to FIGS. 6A and 6B.

FIGS. 8A and 8B are views of another alternate construction of an adapter embodying the invention.

FIGS. 9A and 9B are schematic diagrams illustrating the connection of a "slide-on" battery having a first connecting structure to a "slide-on" electrical component having a second connecting structure.

FIG. 10 is a side view of yet another alternate construction of an adapter embodying the invention.

FIGS. 11A and 11B are schematic diagrams illustrating the connection of a "tower" battery having a first connecting structure to a "tower" electrical component having a second connecting structure.

Figure 2B:
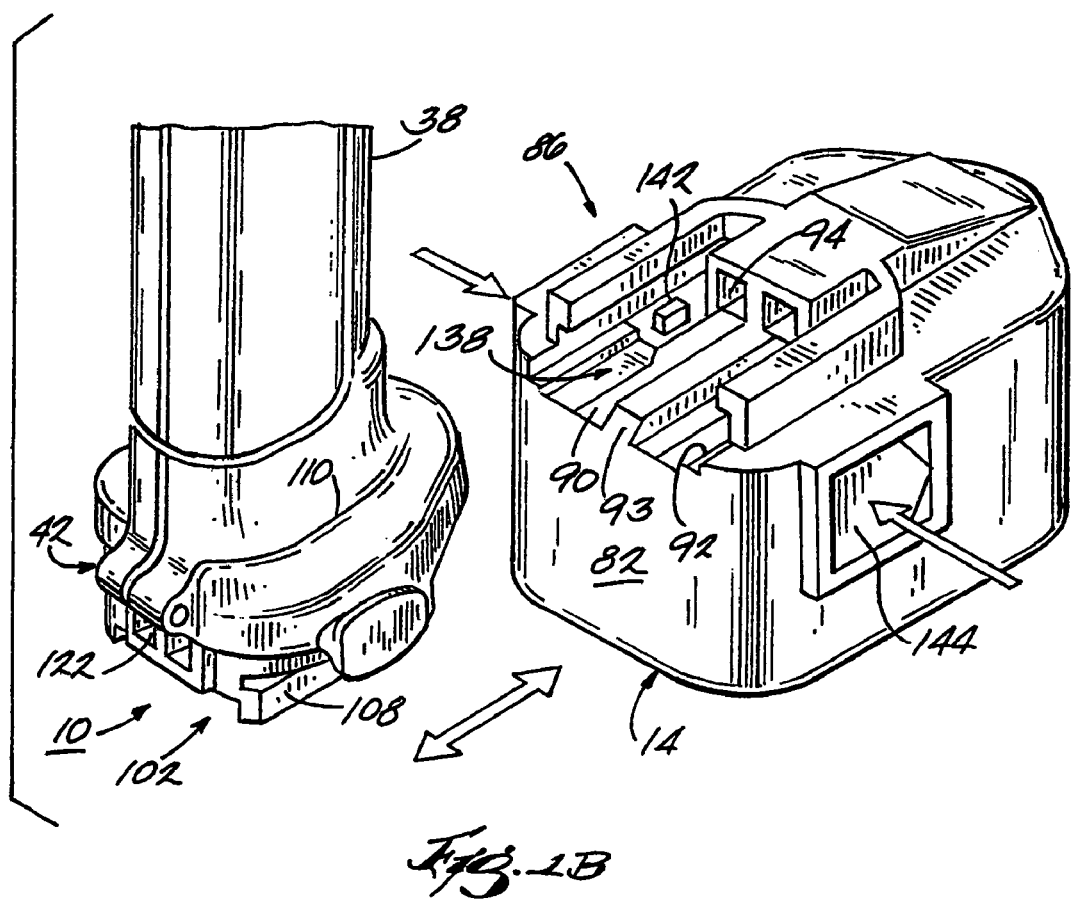

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

An electrical combination including an adapter 10 for a power tool battery 14 is illustrated in FIGS. 1-2. The electrical combination also includes an electrical component, such as a power tool 18 (partially shown in FIGS. 1A and 1B) and/or a battery charger 22 (shown in FIGS. 2A and 2B). It should be understood that the electrical component may be any type of electrical component, such as, for example, a radio, audio device or flashlight, which is usable with a power tool battery.

Figure 3A:
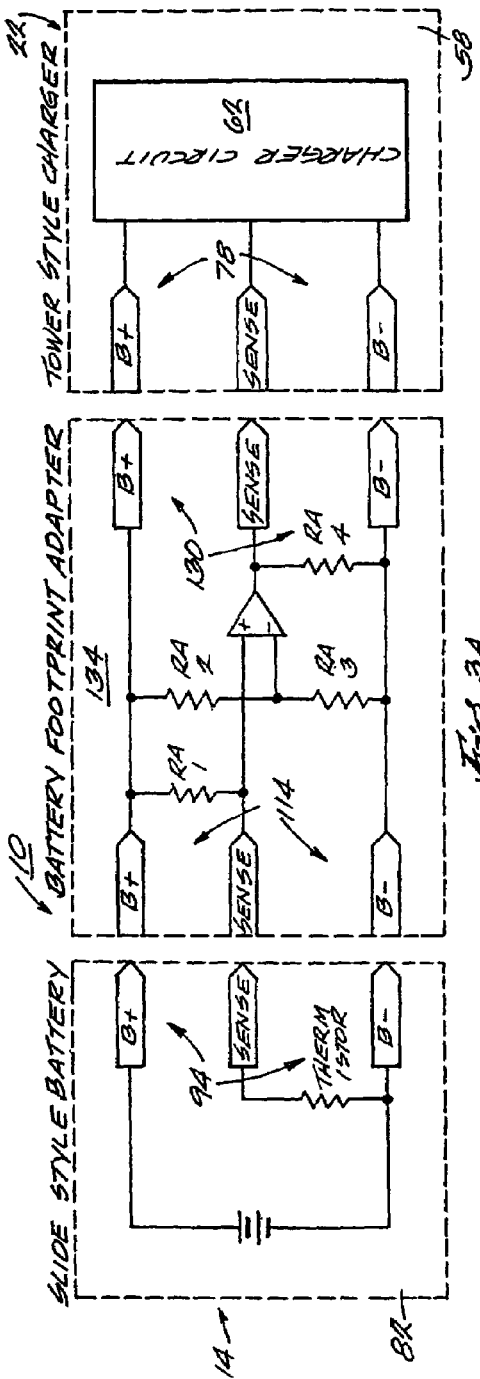
FIGS. 3A and 3B are schematic diagrams illustrating the connection of a battery having a "slide-on" configuration to an electrical component having a "tower" configuration.
Figure 3B:
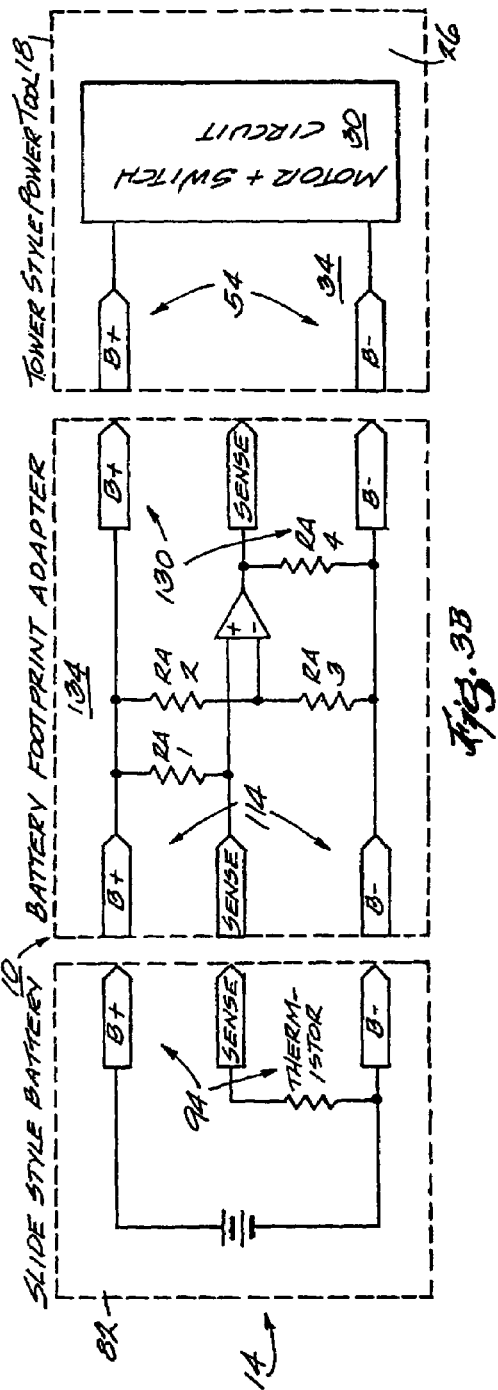

As shown in FIGS. 1A and 1B, the power tool 18 includes a tool housing 26 and an electric motor 30 (schematically illustrated in FIGS. 3B and 4B) supported by the tool housing 26 and operable to drive a tool element (not shown). An electrical circuit 34 (schematically illustrated in FIGS. 3B and 4B) is electrically connected with the motor 30 to electrically connect the motor 30 to a power source, such as the battery 14. The tool housing 26 also includes a handle portion 38.

The power tool 18 includes a connection configuration 42 for connecting the power tool 18 to a battery. In the illustrated construction, the connection configuration 42 of the power tool 18 is a "tower" configuration. A portion of the tool housing 26, such as the handle portion 38, defines an opening 46 extending along an opening axis 50. In this configuration, a motor terminal assembly 54 (schematically illustrated in FIGS. 3B and 4B) is supported in the opening 46 and is electrically connected to the electrical circuit 34 and to the motor 30. Typically, the "tower" power tool 18 is used with a "tower" battery 14', shown in FIGS. 1A and 2A and described below in more detail, without the use of an adapter.

As shown in FIG. 1A, a second power tool 18' includes a second connection configuration 42' which is different than the connection configuration 42 of the first power tool 18. The second connection configuration 42' is a "slide-on" connection configuration. In the "slide-on" connection configuration 42', the handle portion 38' includes (see FIG. 5A) a support portion 56' on which a motor terminal assembly 54' is supported. The "slide-on" battery 14, shown in FIGS. 1A, 1B and 2A and described below in more detail, may be used with the "slide-on" power tool 18' without the use of an adapter.

As shown in FIGS. 2A, the battery charger 22 includes a charger housing 58 and a charging circuit 62 (schematically illustrated in FIGS. 3A and 4A) supported by the charger housing 58 and electrically connectable to a power source (not shown) and to a battery to charge the battery. In the illustrated construction, the battery charger 22 includes a "tower" connection configuration 66, which is similar to the connection configuration 42 of the "tower" power tool 18. In the "tower" connection configuration 66, the charger housing 58 defines an opening 70 extending along an opening axis 74. A charger terminal assembly 78 (schematically illustrated in FIGS. 3A and 4A) is supported in the opening 70 and is electrically connected to the charging circuit 62. Typically, the "tower" charger 22 is used to charge the "tower" battery 14' (shown in FIGS. 1A and 2A) without the use of an adapter.

As shown in FIG. 2B, a second battery charger 22' includes a connection configuration 66' which is different than the connection configuration 66 of the first battery charger 22. The second connection configuration 66' is a "slide-on" connection configuration, which is similar to the connection configuration 42' of the "slide-on" power tool 18'. The "slide-on" connection configuration 66' includes (see FIG. 8A) a support portion 80' and charger terminal assembly 78' supported on the support portion 80'. Typically, the "slide-on" battery 14 can be charged by the "slide-on" charger 22' without the use of an adapter.

As shown in FIGS. 1B and 2B, the battery 14 includes a battery housing 82 supporting one or more rechargeable battery cells (not shown). The battery 14 has a connection configuration 86 which is different than the connection configuration 42 of the power tool 18 and different than the connection configuration 66 of the battery charger 22. In the illustrated construction, the connection configuration 86 is a "slide-on" connection configuration. In the "slide-on" connection configuration 86, the battery housing 82 includes a connecting portion 90 having grooves 92 and projections 93, and a battery terminal assembly 94 is supported on the connecting portion 90. The battery terminal assembly 94 is electrically connected to the rechargeable battery cell(s) and is connectable, with the adapter 10, to the motor 30 to supply power to the motor 30 and to the charging circuit 62 such that the charging circuit 62 selectively supplies power to charge the battery 14. As discussed above, the "slide-on" battery 14 may be used with the "slide-on" power tool 18' and may be charged by the "slide-on" battery charger 22' without the use of an adapter.

As shown in FIG. 2A, the second battery 14' includes a different connection configuration 86' than the connection configuration 86 of the battery 14. In this construction, the connection configuration 86' is a "tower" connection configuration and includes "tower" or insertion portion 96' on which a battery terminal assembly 94' is supported. As discussed above, the "tower" battery 14' may be used with the "tower" power tool 18 and may be charged by the "tower" battery charger 22 without the use of an adapter.

As shown in FIGS. 1-2, the adapter 10 is connectable between the "slide-on" battery 14 and at least one of the "tower" power tool 18 and the "tower" battery charger 22. The adapter 10 includes an adapter housing 98 providing a first connecting portion 102, for connecting the adapter 10 to the battery 14, and a second connecting portion 106, for connecting the adapter 10 to the power tool 18 and/or to the battery charger 22.

In the illustrated construction, the first connecting portion 102 provides a "slide-on" connection configuration similar to the "footprint" of the "slide-on" power tool 18' and/or the "slide-on" charger 22'. The first connecting portion 102 includes a support portion 108 defining a battery attachment axis 110. The support portion 108 includes axially-extending grooves 112 and projections 113. The first connecting portion 102 also includes a first adapter terminal assembly 114 which is electrically connectable to the battery terminal assembly 94. In the illustrated construction, the "slide-on" battery 14 is slidably connectable to the support portion 108 in a first direction along the axis 110.

In the illustrated construction, the battery 14 is selectively connectable to the adapter 10 to have a first orientation (shown in solid lines in FIG. 1B) relative to the adapter 10 and in a second direction along the axis 110 to have a second orientation (reversed from the position shown in solid lines in FIG. 1B) relative to the adapter 10. To accommodate the first and second orientations of the battery 14 relative to the adapter 10, the first adapter terminal assembly 114 includes a forward (for the purposes of description) first adapter terminal assembly 118, which is electrically connectable to the battery terminal assembly 94 when the battery 14 is in the first orientation, and a rearward (for the purposes of description) first adapter terminal assembly 122, which is electrically connectable to the battery terminal assembly 94 when the battery 14 is in the second orientation.

As the battery 14 is connected to the first connecting portion 102, the grooves 92 and projections 93 on the support portion 90 of the battery 14 inter-engage with the grooves 112 and the projections 113 on the support portion 108 of the adapter 10. As the battery 14 is slid onto the support portion 108, the first adapter terminal assembly 114 is electrically connected to the battery terminal assembly 94.

In the illustrated construction, the second connecting portion 106 provides a "tower" connection configuration similar to the "footprint" of the "tower" battery 14'. The second connecting portion 106 includes a "tower" or insertion portion 126 to connect the adapter 10 to the "tower" power tool 18 and/or to the "tower" battery charger 22. The second connecting portion 106 also includes a second adapter terminal assembly 130, which is electrically connectable to the electrical component terminal assembly, such as the motor terminal assembly 54 and/or the charger terminal assembly 78, to electrically connect the adapter 10 to the electrical component, such as the motor 30 and/or the charging circuit 62.

As shown in FIGS. 3-4, the adapter 10 also includes an adapter electrical circuit 134 (schematically illustrated) to electrically connect the first adapter terminal assembly 114 to the second adapter terminal assembly 130. As shown in FIGS. 3-4, the adapter electrical circuit 134 includes electrical components and electrical structure to accommodate the differences between the electrical configuration of the battery 14 and battery terminal assembly 94 and the electrical configuration of the electrical component, such as the motor 30 and/or the charging circuit 62, and electrical component terminal assembly, such as the motor terminal assembly 54 and/or the charger terminal assembly 78.

As shown in FIGS. 1B and 2B, the electrical combination also includes a first locking assembly 138 for locking the battery 14 to the adapter 10. In the illustrated construction, the first locking assembly 138 includes a first locking member or moveable projection 142 supported on the battery 14 and a second locking member or recess 146 defined by the support portion 108. The moveable projection 142 is engageable in the recess 146 to lock the battery 14 to the adapter 10. The first locking assembly 138 also includes an actuator 144 for moving the projection 142 into and out of engagement with the recess 146. A spring (not shown) biases the projection 142 and the actuator 144 to a position in which the projection 142 engages the recess 146. It should be understood that, in other constructions (not shown), the locking members 142 and 146 may be reversed and supported on the adapter 10 and the battery 14, respectively.

The electrical combination also includes (see FIG. 1A) a second locking assembly 150 for locking the adapter 10 to the power tool 18 and/or to the battery charger 22. The second locking assembly includes a first locking member or moveable projection 154 supported on the adapter 10 adjacent the support portion 108 and a second locking member for recess 158 defined by the handle portion 38 of the power tool 18. An actuator 156 moves the projection 154 into and out of engagement with the recess 158. A spring (not shown) biases the projection 154 and the actuator 156 to a position in which the projection 154 engages the recess 158. It should also be understood that, in other constructions (not shown), the locking members 154 and 158 may be reversed and supported on the handle portion 38 and the adapter 10, respectively.

While, in the illustrated construction, the adapter 10 is not locked to the battery charger 22 when used with the battery charger 22, it should be understood that, in other constructions (not shown), a similar locking arrangement may be provided to lock the adapter 10 to the battery charger 22.

To use the "slide-on" battery 14 with the "tower" power tool 18, the adapter 10 is connected between the battery 14 and the power tool 18. As shown in FIG. 1A, the insertion portion 126 of the adapter 10 is inserted into the opening 46 in the handle portion 38 so that the adapter 10 is connected to the handle portion 38 and so that the second adapter terminal assembly 130 is electrically connected with the motor terminal assembly 54. The actuator 156 is released when the insertion portion 126 is fully inserted into the opening 46. The spring moves the projection 154 into engagement with the recess 158 to lock the adapter 10 to the power tool 18.

As shown in FIG. 1B, the battery 14 is then connected to the adapter 10. The battery 14 is slid along the axis 110 so that the connecting portion 90 is connected to the support portion 108. The grooves 92 and 112 and the projections 93 and 113 are inter-engaged to connect the battery 14 to the adapter 10. When the battery 14 has been slid to its furthest extent on the support portion 108, the actuator 144 is released so that the projection 142 engages the recess 146 to lock the battery 14 to the adapter 10. As the battery 14 is slid onto the support portion 108, the first adapter terminal assembly 114 is electrically connected to the battery terminal assembly 94.

As shown in solid lines in FIG. 1B, the battery 14 is in the first orientation relative to the adapter 10 and relative to the power tool 18. In this orientation, the forward first adapter terminal assembly 118 is electrically connected with the battery terminal assembly 94. Once the battery 14 is connected to the adapter 10 and the adapter 10 is connected to the power tool 18, the adapter electrical circuit 134 connects the battery 14 to the motor 30. The power tool 18 may then be operated under the power of the battery 14.

In the reverse position from the position shown in solid lines in FIG. 1B, the battery 14 may be connected to the adapter 10 in the second orientation. In the second orientation, the rearward first adapter terminal assembly 122 is electrically connected to the battery terminal assembly 94.

To remove the battery 14, the actuator 144 is depressed so that the projection 142 is moved out of the recess 146. The battery 14 is then slid along the axis 110 so that the connecting portion 90 is disengaged from the support portion 108. To remove the adapter 10 from the power tool 18, the actuator 156 is depressed so that the projection moves out of engagement with the recess 158. The adapter 10 is then moved outwardly so that the tower portion 126 is removed from the opening 46.

To charge the "slide-on" battery 14 with the "tower" charger 22, the adapter 10 is used to connect the battery 14 to the charger 22. The battery 14 is connected to the adapter 10 as described above. The battery 14 and the adapter 10 are then connected to the charger 22. The tower portion 126 is inserted into the opening 70 so that the second adapter terminal assembly 130 is electrically connected with the charger terminal assembly 78 to electrically connect the battery 14 to the charging circuit 62. The "slide-on" battery 14 may then be charged by the "tower" charger 22.

In the construction illustrated in FIGS. 1-4, the adapter 10 enables a battery having one general configuration, such as the "slide-on" battery 14, to be used with a power tool 18 having another general configuration, such as the "tower" power tool 18. The adapter 10 also enables a battery having one general configuration, such as the "slide-on" battery 14, to be charged by a battery charger having another general configuration, such as the "tower" charger 22.

An alternate construction of an adapter 10' is illustrated in FIGS. 5-7. Common elements are identified by the same reference number """.

In this alternate construction, the adapter 10' enables a "tower" battery 14' to be used with a "slide-on" power tool 18' and/or to be charged by a "slide-on" charger 22'. The adapter 10' an adapter housing 98' providing a first connecting portion 102', for connecting the adapter 10' to the battery 14', and a second connecting portion 106', for connecting the adapter 10' to the power tool 18' and/or to the charger 22'.

In this illustrated construction, the first connecting portion 102' provides a "tower" connection configuration similar to the "footprint" of the "tower" power tool 18 and/or the "tower" charger 22. The adapter housing 98' defines an opening 162 extending along an opening axis 166. The insertion portion 96' of the "tower" battery 14' is received in the opening 162 to support the battery 14' on the adapter 10'.

A first adapter terminal assembly 114' is supported in the opening 162 and is electrically connectable with the battery terminal assembly 94'.

In this illustrated construction, the second connecting portion 106' provides a "slide-on" connection configuration similar to the "footprint" of the "slide-on" battery 14. The adapter housing 98' includes a support portion 170 defining an adapter attachment axis 174. The support portion 170 of the adapter 10' has a construction which is complementary to the construction of the support portion 56' of the "slide-on" power tool 18' and/or to the support portion 80' of the "slide-on" charger 22'. The second connecting portion 106' also includes a second adapter terminal assembly 130', which is electrically connectable to the electrical component terminal assembly, such as the motor terminal assembly 54' and/or the charger terminal assembly 78', to electrically connect the adapter 10' to the electrical component, such as the motor 30' and/or the charging circuit 62'.

As shown in FIGS. 6-7, the adapter 10' also includes an adapter electrical circuit 134' (schematically illustrated) to electrically connect the first adapter terminal assembly 114' to the second adapter terminal assembly 130'. As shown in FIGS. 6-7, the adapter electrical circuit 134' includes electrical components and electrical structure to accommodate the differences between the electrical configuration of the battery 14' and battery terminal assembly 94' and the electrical configuration of the electrical component, such as the motor 30' and/or the charging circuit 62', and electrical component terminal assembly, such as the motor terminal assembly 54' and/or the charger terminal assembly 78'.

In this alternate construction, the electrical combination also includes a first locking arrangement (not shown) for locking the adapter 10' to the battery 14' and a second locking arrangement (not shown) for locking the adapter 10' to the power tool 18' and/or to the charger 22'.

Another alternate construction of an adapter 200 is illustrated in FIGS. 8-9. In this alternate construction, the adapter 200 enables a "slide-on" battery 204 having a different connecting structure to be used with the "slide-on" power tool 18' and/or to be charged by the "slide-on" charger 22'.

The battery 204 has a "slide-on" connection configuration 208 (shown in FIG. 8A) having a different connecting structure than the connection configuration 86 (shown in FIGS. 1B and 2B) of the first "slide-on" battery 14. As shown in FIG. 8A, the connection configuration 208 includes a connecting portion 212 having a generally T-shaped cross-section. The connecting portion 212 includes a battery projection 213 defining a battery groove 214. A battery terminal 216 is supported on the connecting portion 212.

The support portion 56' of the "slide-on" power tool 18' also has a T-shaped cross-section (similar to that of the first connecting portion 102 of the adapter 10). The support portion 56' includes a component projection 217 defining a component groove 218. Similarly, the support portion 80' of the "slide-on" charger 22' has a T-shaped cross-section and includes the projection 217 and the groove 218.

The adapter 200 includes a first connecting portion 220 having a generally C-shaped cross-section and connecting structure complementary to the connecting portion 212 of the battery 204. The first connecting portion 220 includes a first adapter projection 221 defining a first adapter groove 222. A first adapter terminal assembly 224 is supported on the first connecting portion 220 and is electrically connectable with the battery terminal 216.

The adapter 200 also includes a second connecting portion 228 having a generally C-shaped cross-section and connecting structure complementary to the support portion 56' of the power tool 18' and/or to the support portion 80' of the charger 22'. The second connecting portion 228 includes a second adapter projection 229 defining a second adapter groove 230. A second adapter terminal assembly 232 is supported on the second connecting portion 228 and is electrically connectable with the electrical component terminal assembly, such as the motor terminal assembly 54' and/or the charger terminal assembly 78', to electrically connect the adapter 200 to the electrical component, such as the motor 30' and/or the charging circuit 62'.

As shown in FIGS. 9A and 9B, the adapter 200 also includes an adapter electrical circuit 236 (schematically illustrated) to electrically connect the first adapter terminal assembly 224 to the second adapter terminal assembly 232. As shown in FIGS. 9A and 9B, the adapter electrical circuit 236 includes electrical components and electrical structure to accommodate the differences between the electrical configuration of the battery 204 and battery terminal assembly 216 and the electrical configuration of the electrical component, such as the motor 30' and/or the charging circuit 62', and electrical component terminal assembly, such as the motor terminal assembly 54' and/or the charger terminal assembly 78'.

The adapter 200 enables a battery having a first general configuration, such as the second "slide-on" battery 204, to be used with a power tool having the same general configuration, such as the "slide-on" power tool 18', and a different connecting structure (i.e., a physical connecting arrangement different than the physical connecting arrangement of the battery 204 and/or an electrical connecting arrangement different than the electrical connecting arrangement of the battery 204). The adapter 200 also enables the second "slide-on" battery 204 to charged by a battery charger having the same general configuration, such as the "slide-on" charger 22, and a different connecting structure.

Yet another alternate construction of an adapter 200' is illustrated in FIGS. 10-11. Common elements are identified by the same reference number """.

In this alternate construction, the adapter 200' enables a "tower" battery 204' having a different connecting structure to be used with the "tower" power tool 18 and/or to be charged by the "tower" charger 22. The battery 204' has a "tower" connection configuration 240 (shown in FIG. 10) having a different connecting structure than the connection configuration 86' (shown in FIGS. 1A and 2A) of the first "tower" battery 14'. As shown in FIG. 10, the connection configuration 240 includes a "tower" or insertion portion 244 on which a battery terminal 216' is supported.

As discussed above, the "tower" connection configuration 42 of the power tool 18 includes the opening 46 defined by the handle 38. The "tower" connection configuration 240 of the second "tower" battery 204' is not complementary to this connection configuration 42. For example, the insertion portion 244 may have different dimensions (diameter d, height h, cross-section, etc.) than the dimensions of the opening 46. Similarly, the "tower" connection configuration 240 of the second "tower" battery 204' is not complementary to the connection configuration 66 of the "tower" charger 22.

The adapter 200' accommodates the differences between the connection configuration 240 of the "tower" battery 204' and the connection configuration 42 of the "tower" power tool 18 and/or the connection configuration 66 of the "tower" charger 22. In some constructions, the adapter 200' is preferably formed as a sleeve member to fit between the outer surface of the insertion portion 244 of the battery 204' and the inner surface of the opening 46 of the "tower" power tool 18 and/or of the opening 70 of the "tower" charger 22.

As shown in FIGS. 11A and 11B, the adapter 200' also includes an adapter electrical circuit 236' (schematically illustrated) to electrically connect a first adapter terminal assembly 224' to the second adapter terminal assembly 232'. As shown in FIGS. 11A and 11B, the adapter electrical circuit 236' includes electrical components and electrical structure to accommodate the differences between the electrical configuration of the battery 204' and battery terminal assembly 216' and the electrical configuration of the electrical component, such as the motor 30 and/or the charging circuit 62, and electrical component terminal assembly, such as the motor terminal assembly 54 and/or the charger terminal assembly 78.

One or more of the above-described and other independent features and independent advantages of the invention are set forth in the following claims:

We claim:

1. An electrical combination comprising:
    an electrical component including
        a component housing, and
        an electrical circuit supported by the component housing;
    a first terminal assembly at least electrically connectable to the electrical circuit;
    a second terminal assembly at least electrically connectable to the electrical circuit and removable from the electrical circuit;
    a first battery including a first battery terminal assembly having a positive terminal and a negative terminal and being electrically connectable to the first terminal assembly to electrically connect the first battery to the electrical circuit such that power is transferable between the first battery and the electrical circuit; and
    a second battery including a second battery terminal assembly having a positive terminal and a negative terminal and being electrically connectable to the second terminal assembly to electrically connect the second battery to the electrical circuit such that power is transferable between the second battery and the electrical circuit, the second battery being different than the first battery, at least one of the first battery terminal assembly not being electrically connectable to the second terminal assembly and the second battery terminal assembly not being electrically connectable to the first terminal assembly.

2. The electrical combination of claim 1, wherein the electrical component includes a power tool, the power tool including a motor electrically connected to the electrical circuit and supported by the component housing, wherein the first battery terminal assembly is electrically connectable to the first terminal assembly to electrically connect the first battery to the electrical circuit such that power is transferable between the first battery and the electrical circuit to power the motor, and wherein the second battery terminal assembly is electrically connectable to the second terminal assembly to electrically connect the second battery to the electrical circuit such that power is transferable between the second battery and the electrical circuit to power the motor.

3. The electrical combination of claim 1, wherein the electrical component includes a battery charger, the battery charger including a charging circuit electrically connected to the electrical circuit and supported by the component housing, wherein the first battery terminal assembly is electrically connectable to the first terminal assembly to electrically connect the first battery to the electrical circuit such that power is transferable between the first battery and the electrical circuit to charge the first battery, and wherein the second battery terminal assembly is electrically connectable to the second terminal assembly to electrically connect the second battery to the electrical circuit such that power is transferable between the second battery and the electrical circuit to charge the second battery.

4. The electrical combination of claim 1, and further comprising an adapter including
an adapter housing separate from and connectable between the second battery and the component housing to support the second battery on the component housing, the second terminal assembly being supported by the adapter housing, and
an adapter electrical circuit supported by the adapter housing, the adapter electrical circuit electrically connecting the second terminal assembly to the electrical circuit.

5. The electrical combination of claim 4, wherein the adapter further includes an adapter terminal assembly electrically connectable to the first terminal assembly to electrically connect the adapter electrical circuit to the electrical circuit.

6. The electrical combination of claim 1, and further comprising:
a first support structure having a first configuration and operable to support the first battery; and
a second support structure having a second configuration and operable to support the second battery, the second configuration being different than the first configuration.

7. The electrical combination of claim 6, wherein the first support structure includes a tower support structure, the tower support structure defining an insertion opening, and wherein the first battery has a tower portion insertable into the insertion opening.

8. The electrical combination of claim 6, wherein the first support structure includes a slide-on support structure, the slide-on support structure including a support rail, and wherein the first battery has a groove portion receiving the support rail.

9. The electrical combination of claim 6, and further comprising an adapter including an adapter housing separate from and connectable between the second battery and the component housing to support the second battery on the component housing, the adapter housing at least partially providing the second support structure.

10. A method of operating an electrical combination, the electrical combination including an electrical component including a component housing, and an electrical circuit supported by the component housing, a first terminal assembly at least electrically connectable to the electrical circuit, a second terminal assembly at least electrically connectable to the electrical circuit, a first battery including a first battery terminal assembly, and a second battery including a second battery terminal assembly, the second battery being different than the first battery, the method comprising the acts of:
electrically connecting a positive terminal and a negative terminal of the first battery terminal assembly to the first terminal assembly to electrically connect the first battery to the electrical circuit;
transferring power between the first battery and the electrical circuit;
electrically connecting a positive terminal and a negative terminal of the second battery terminal assembly to the second terminal assembly to electrically connect the second battery to the electrical circuit;
transferring power between the second battery and the electrical circuit; and
separating the second terminal assembly from the electrical circuit;
wherein at least one of the first battery terminal assembly is not electrically connectable to the second terminal assembly and the second battery terminal assembly is not electrically connectable to the first terminal assembly.

11. The method of claim 10, wherein the electrical component includes a power tool, the power tool including a motor electrically connected to the electrical circuit and supported by the component housing, wherein the act of transferring power between the first battery and the electrical circuit includes the act of transferring power from the first battery to the motor, and wherein the act of transferring power between the second battery and the electrical circuit includes the act of transferring power from the second battery to the motor.

12. The method of claim 10, wherein the electrical component includes a battery charger, the battery charger including a charging circuit electrically connected to the electrical circuit and supported by the component housing, wherein the act of transferring power between the first battery and the electrical circuit includes the act of transferring power from the charging circuit to the first battery to charge the first battery, and wherein the act of transferring power between the second battery and the electrical circuit includes the act of transferring power from the charging circuit to the second battery to charge the second battery.

13. The method of claim 10, wherein the electrical combination further includes an adapter including an adapter housing separate from and connectable between the second battery and the component housing to support the second battery on the component housing, the second terminal assembly being supported by the adapter housing, and an adapter electrical circuit supported by the adapter housing, and wherein the act of electrically connecting the second battery terminal assembly to the second terminal assembly includes the act of electrically connecting the adapter electrical circuit to the electrical circuit to electrically connect the second terminal assembly to the electrical circuit.

14. The method of claim 13, wherein the adapter further includes an adapter terminal assembly, wherein the act of electrically connecting the adapter electrical circuit to the electrical circuit includes the act of electrically connecting the adapter terminal assembly to the first terminal assembly to electrically connect the adapter electrical circuit to the electrical circuit.

15. The method of claim 10, wherein the electrical combination further includes a first support structure having a first configuration and operable to support the first battery, and a second support structure having a second configuration and operable to support the second battery, the second configuration being different than the first configuration, and wherein the method further comprises the act of:
before the acts of electrically connecting the first battery terminal assembly to the first terminal assembly to electrically connect the first battery to the electrical circuit and transferring power between the first battery and the electrical circuit, the act of connecting the first battery to the first support structure; and
before the acts of electrically connecting the second battery terminal assembly to the second terminal assembly to electrically connect the second battery to the electrical circuit and transferring power between the second battery and the electrical circuit, the act of connecting the second battery to the second support structure.

16. The method of claim 15, wherein the first support structure includes a tower support structure, the tower support structure defining an insertion opening, wherein the first battery has a tower portion, and wherein the act of connecting the first battery to the first support structure includes the act of inserting the tower portion into the insertion opening.

17. The method of claim 15, wherein the first support structure includes a slide-on support structure, the slide-on support structure including a support rail, wherein the first battery has a groove portion, and wherein the act of the act of connecting the second battery to the second support structure includes the act of receiving the support rail in the groove portion.

18. The method of claim 15, wherein the electrical combination further includes an adapter including an adapter housing separate from and connectable between the second battery and the component housing to support the second battery on the component housing, the adapter housing at least partially providing the second support structure, and wherein the act of connecting the second battery to the second support structure includes the act of connecting the second battery to the adapter housing.

19. An electrical combination comprising:
   a power tool including
      a housing,
      a motor supported by the housing and operable to drive a tool element, and
      an electrical circuit supported by the housing and electrically connected to the motor;
   a first terminal assembly at least electrically connectable to the electrical circuit;
   a second terminal assembly at least electrically connectable to the electrical circuit and removable from the electrical circuit;
   a first battery including a first battery terminal assembly having a positive terminal and a negative terminal and being electrically connectable to the first terminal assembly to electrically connect the first battery to the electrical circuit such that power is transferable between the first battery and the electrical circuit to power the motor; and
   a second battery including a second battery terminal assembly having a positive terminal and a negative terminal and being electrically connectable to the second terminal assembly to electrically connect the second battery to the electrical circuit such that power is transferable between the second battery and the electrical circuit to power the motor, the second battery being different than the first battery, at least one of the first battery terminal assembly not being electrically connectable to the second terminal assembly and the second battery terminal assembly not being electrically connectable to the first terminal assembly.

20. The electrical combination of claim 19, and further comprising an adapter including
   an adapter housing separate from and connectable between the second battery and the housing to support the second battery on the housing, the second terminal assembly being supported by the adapter housing,
   an adapter electrical circuit supported by the adapter housing, and
   an adapter terminal assembly electrically connectable to the first terminal assembly to electrically connect the adapter electrical circuit to the electrical circuit such that the adapter electrical circuit electrically connects the second terminal assembly to the electrical circuit.

* * * * *